US008337310B1

(12) United States Patent
Bjordahl et al.

(10) Patent No.: US 8,337,310 B1
(45) Date of Patent: Dec. 25, 2012

(54) MARGIN-BASED ONLINE GAME

(76) Inventors: Hans Bjordahl, Seattle, WA (US); Holly Irvine, Seattle, WA (US)

( * ) Notice: Subject to any disclaimer, the term of this patent is extended or adjusted under 35 U.S.C. 154(b) by 1464 days.

(21) Appl. No.: 11/613,808

(22) Filed: Dec. 20, 2006

Related U.S. Application Data

(60) Provisional application No. 60/752,520, filed on Dec. 20, 2005.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. .......................................... 463/42; 463/25

(58) Field of Classification Search .............. 700/91–93; 463/42, 25

See application file for complete search history.

(56) References Cited

U.S. PATENT DOCUMENTS

| | | | | |
|---|---|---|---|---|
| 5,083,271 A * | 1/1992 | Thacher et al. | ................ | 700/92 |
| 6,112,128 A * | 8/2000 | Steinmetz | ................ | 700/91 |
| 6,236,900 B1 * | 5/2001 | Geiger | ................ | 700/91 |
| 6,293,868 B1 * | 9/2001 | Bernard | ................ | 463/42 |
| 6,371,855 B1 * | 4/2002 | Gavriloff | ................ | 463/42 |
| 6,968,243 B1 * | 11/2005 | Oh | ................ | 700/91 |
| 2002/0016197 A1 * | 2/2002 | Candelaria | ................ | 463/16 |
| 2004/0010484 A1 * | 1/2004 | Foulger et al. | ................ | 706/50 |

* cited by examiner

*Primary Examiner* — Michael Cuff
*Assistant Examiner* — Kevin Y Kim
(74) *Attorney, Agent, or Firm* — Christensen O'Connor Johnson Kindness PLLC

(57) ABSTRACT

The invention utilizes the predicted margin of victory in an event as a metric on which to base an online game in which users attempt to predict the outcome of an upcoming event or set of events. The game also utilizes the aggregate of all the margins set by users participating in the game as a measure of how users participating in the game, as a whole, are predicting the outcome of a pending event. This is achieved by means of a method for enabling users to identify upcoming events within the context of the game and enter values to record their predicted winners and margins for one or more of these upcoming events.

6 Claims, 7 Drawing Sheets

300

400

500

600

700

MARGIN-BASED ONLINE GAME

CROSS-REFERENCE TO RELATED APPLICATION

This application claims the benefit of U.S. Provisional Patent Application No. 60/752,520, filed Dec. 20, 2005, the disclosure of which is hereby expressly incorporated by reference, and the filing date of which is hereby claimed under 35 U.S.C. §119(e).

BACKGROUND

The Internet has emerged as a platform for multi-player online games (hereinafter "games"). In some situations, existing games invite users to predict the winners of upcoming events, for example, sporting tournaments like horse racing, football game, cricket match, etc. The users are scored based on the success of their predictions once the event has transpired. In other situations, existing games invite users to identify players in upcoming events. Users are scored based on the quantifiable achievements of these participants in the actual event, a type of game popularly known as a "fantasy team" game. However, these conventional approaches to predict the outcome of a game do not take into account an element used in other contexts to measure a predicted outcome of a pending event, namely the predicted margin of victory of the winning team or player over the losing team or player. Further, these conventional approaches to predictive games do not offer a meaningful level of insight in to how the values set by all the users, in aggregate, serve as their own predictive indication of the likely outcome of the event.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment, a method for predicting a winner of one or more upcoming events between two or more teams or players is provided. For each user, the method comprising storing a margin of victory of a predictive winner for each upcoming event. The method further comprising calculating an aggregate margin of victory of a predicative winner of each upcoming event and displaying the aggregated margin of victory of the predictive winner of each upcoming event on a web page. The method then entering a margin of victory of the winner of each completed event. After the margin of victory of the winner is entered, the method, for each user, registering the user before calculating a score using the margin of victory of the winner and the margin of victory of the predictive winner for each completed upcoming event, displaying a list of scores for one or more completed upcoming events on an individual scoring web page, and displaying a score and rank for each completed upcoming event on a ranking web page. The users' score is calculated as the difference between the user's predicted margin for the event and the actual margin of the outcome of the event once it occurs. The method further comprising tracking the score of each registered user and comparing their score with those of other registered users. The method also aggregating the margins set by users for each upcoming event and displaying this information as public information to indicate how users, as a whole, are predicting the outcome of the event.

In accordance with another embodiment, a computer-readable medium having instructions stored thereon that direct a computing system to predict a winner of one or more upcoming events between two or more teams or players is provided. The instructions, for each user, store a margin of victory of a predictive winner for each upcoming event. The instructions calculate an aggregate margin of victory of a predictive winner of each upcoming event for all users and display the aggregate margin of victory of the predictive winner of each upcoming event on a first electronic document and enter a margin of victory of the winner of each completed upcoming event. For each user, the instructions further register the user before a score is calculated using the margin of victory of the winner and the margin of victory of the predictive winner for each completed upcoming event, display a list of scores for one or more completed upcoming events on a second electronic document, and display a score and rank of all users for each completed upcoming event on a third electronic document.

In accordance with yet another embodiment, a computing system for predicting a winner of one or more upcoming events between two or more teams or players is provided. The system comprises a component adapted to store a margin of victory of a predictive winner for each upcoming event, a component adapted to enter a margin of victory of the winner of each completed upcoming event, and a component adapted to calculate an aggregate margin of victory of a predictive winner of each upcoming event for all users and a component adapted to display the aggregate margin of victory of the predictive winner of each upcoming event on a first Internet document. For each user, the system further comprises a component adapted to register the user before calculating a score using the margin of victory of the winner and the margin of victory of the predictive winner for each completed upcoming event, a component adapted to display a list of scores for one or more completed upcoming events on a second Internet document, and a component adapted to display a score and rank of all users for each completed upcoming event on a third Internet document.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The principal and secondary objects of the invention are to utilize the margin of victory as a metric on which to base a game in which users attempt to predict the outcome of an upcoming event or set of events, and to utilize the aggregate of the margins set by users participating in the game as a measure of how users participating in the game, as a whole, are predicting the outcome of the pending event.

Figure 1:
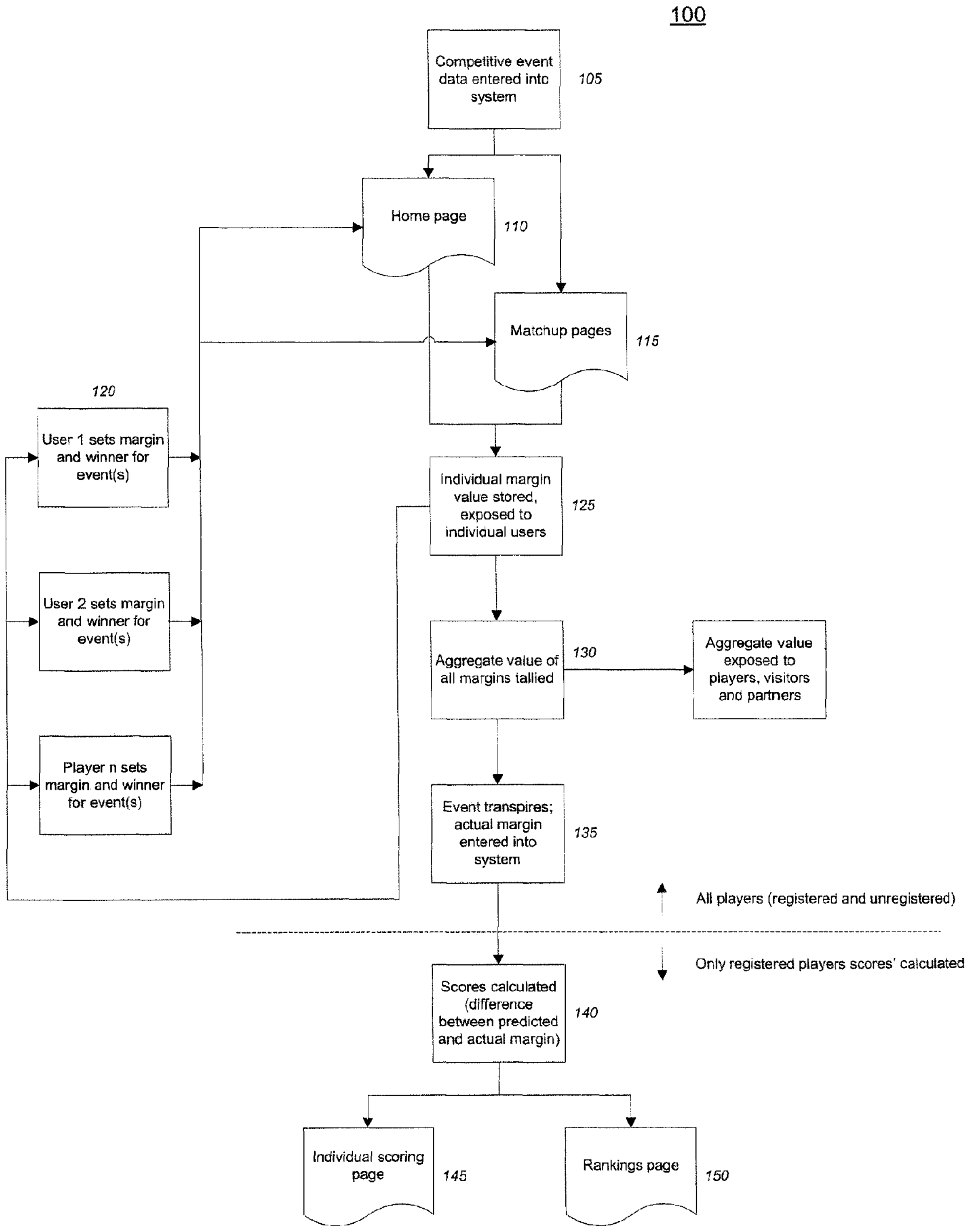
FIG. 1 is a flow chart illustrating an exemplary method of collecting, aggregating and displaying margin values entered by a user, according to one embodiment of the present invention.

FIG. 1 is a flow chart outlining the stages involved in a method 100 consistent with an embodiment of the present invention. Method 100 begins at stage 105 in which the competitive event information (e.g. type of event, teams or players competing in the event, time of event, descriptive text about the event, and organizational structure of multiple events into weeks or seasons) is entered. This event information may be used to generate a home page at stage 110, which is also further discussed with regard to FIG. 2, and individual matchup pages at stage 115, which is also further discussed with regard to FIG. 3.

The method proceeds to stage 120, wherein users may interact with the home page or matchup pages to enter their predicted winner and margin for one or more of the events displayed on the home page or matchup pages. Once entered by a user, this information is stored via stage 125, where the user may see and access this value and edit it if so desired.

The method proceeds to stage 130, wherein the aggregate margins of all users who have chosen to set a value for an event are calculated. In accordance with one embodiment, this calculation may be taken as an average of all margins entered for a specific event, with margins set for opposing teams considered offsetting. For example: if two users enter identical margin values for a matchup, but pick opposing teams, i.e. User A sets the margin as "Team A wins by 3 points" and User B sets the margin for the same event as "Team B wins by 3 points," the average margin calculated and displayed would be "0" or "Tie." If User A sets the margin as "Team A wins by 3 points" and User B sets the margin for the same event as "Team B wins by 1 point," the average margin calculated and displayed would be "Team. A by 1 point." If User A sets the margin as "Team A wins by 3 points" and User B sets the margin for the same event as "Team A wins by 6 points," the average margin calculated and displayed would be "Team A by 4.5 points."

The method proceeds to stage 135, wherein the actual result of the event is entered, and this value is used to calculate the users' scores. In accordance with one embodiment, the score may be determined by calculating the difference between the winner and margin set by the user and the winner and margin of the actual event, treating margins for opposing teams as opposing values. For example: if User A sets the margin for an event as "Team A wins by 3 points" and Team A wins by 6 points, the user User A would be assigned a score of 3. If User A sets the margin as "Team A wins by 3 points" and Team B wins by 3 points, the user User A would be assigned a score of 6. If User A sets the margin as "Team A wins by 3" points and Team A wins by 3 points, the user User A would be assigned a score of 0. To determine the user's total score for a set of events across a week or a season of events, the user's scores may be added together. In embodiments where users compete with each other, a lower score would be considered the winning score. A user must be registered to have his or her scores calculated, stored and displayed.

Figure 4:
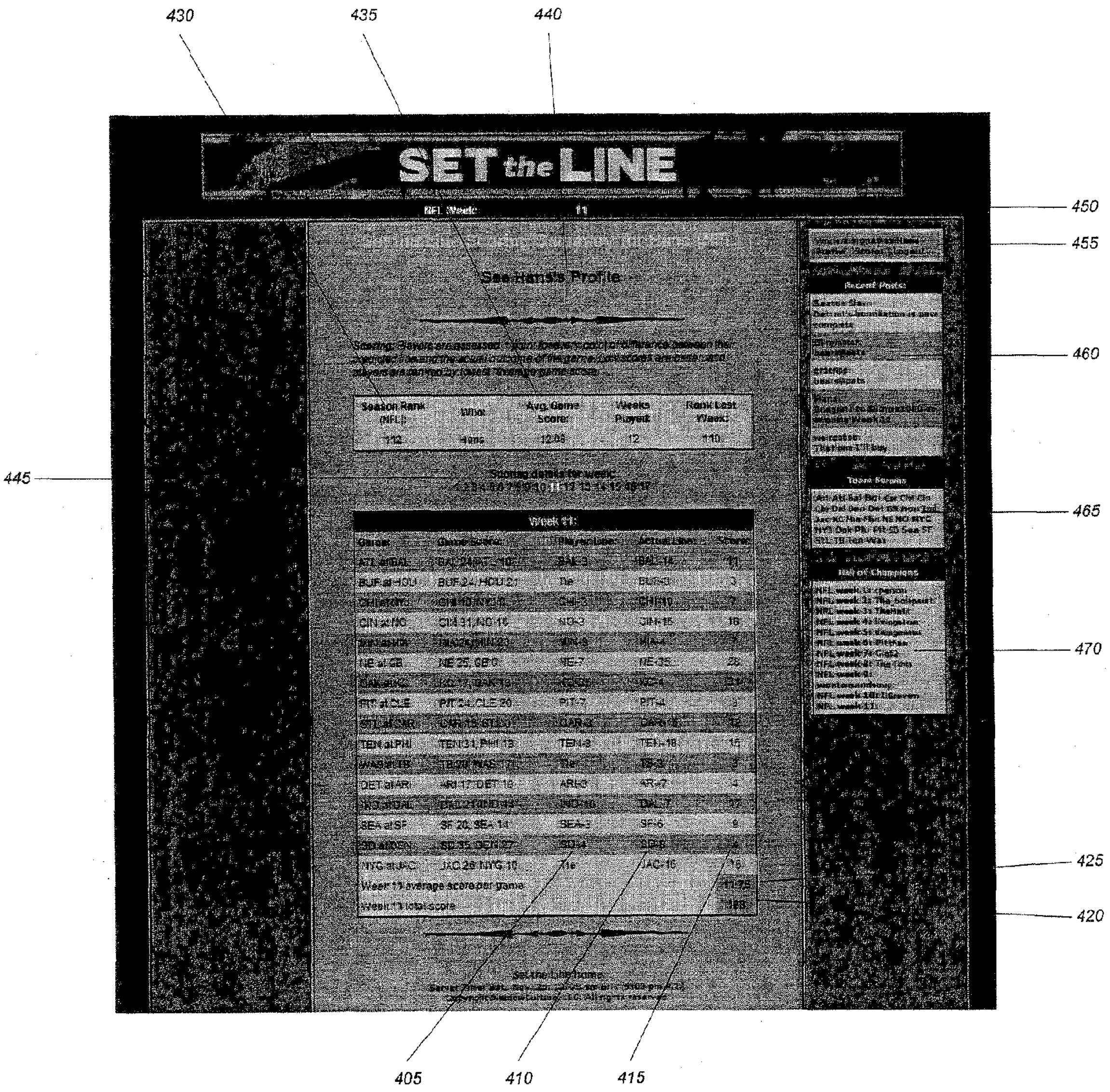
FIG. 4 illustrates an exemplary individual scoring page for a player in another embodiment of the present invention.

The method proceeds to stage 140, wherein registered users' scores may be tallied and listed on an individual scoring page at stage 145, which is also further discussed in FIG. 4. Users' scores are compared and ranked in a rankings page at stage 150, which is also further discussed in FIG. 5.

Figure 2:
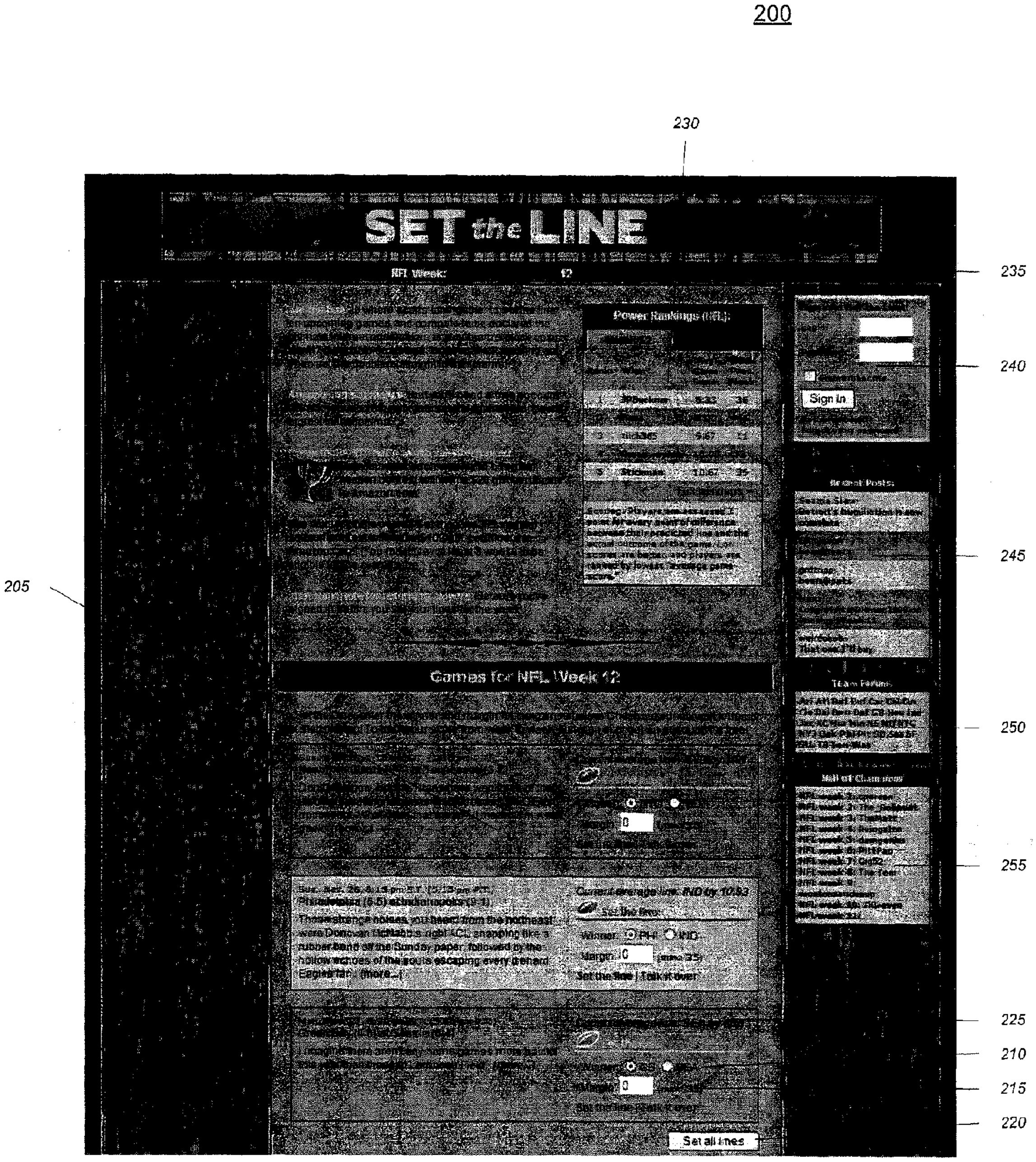
FIG. 2 illustrates an exemplary homepage in another embodiment of the present invention.

FIG. 2 illustrates an exemplary home page interface 200 according to one embodiment. The home page may provide users with a view of the current week 205 of the featured season of events. Utilizing this interface, the user may select the winner 210 and margin 215 of each featured event, and then submit the selected winner and margin of each featured event using a submit link or button 220.

By aggregating the input of all users who have chosen to enter a winner and margin for a specific event, an "average margin" or "average line" for the event 225 may be calculated and displayed. In accordance with one embodiment, this calculation may be taken as an average of all margins entered for a specific event, with margins set for opposing teams considered offsetting. For example: if two users enter identical margin values for a matchup, but pick opposing teams, i.e. User A sets the margin as "Team A wins by 3 points" and User B sets the margin for the same event as "Team B wins by 3 points," the average margin calculated and displayed would be "0" or "Tie." If User A sets the margin as "Team A wins by 3 points" and User B sets the margin for the same event as "Team B wins by 1 point," the average margin calculated and displayed would be "Team A by 1 point." If User A sets the margin as "Team A wins by 3 points" and User B sets the margin for the same event as "Team A wins by 6 points," the average margin calculated and displayed would be "Team A by 4.5 points."

The home page may also provide a rankings "snapshot" 230 of the top, for example, five currently ranked players. Additional elements on the rankings page may include a means to navigate between different sets of competitive events 235, a means for registered users to login and unregistered users to begin the registration process 240, the most recent, for example, five posts from the Web site's forums 245, links to specific forums 250, and a list of users who were winners from previous weeks or seasons 255.

Figure 3:
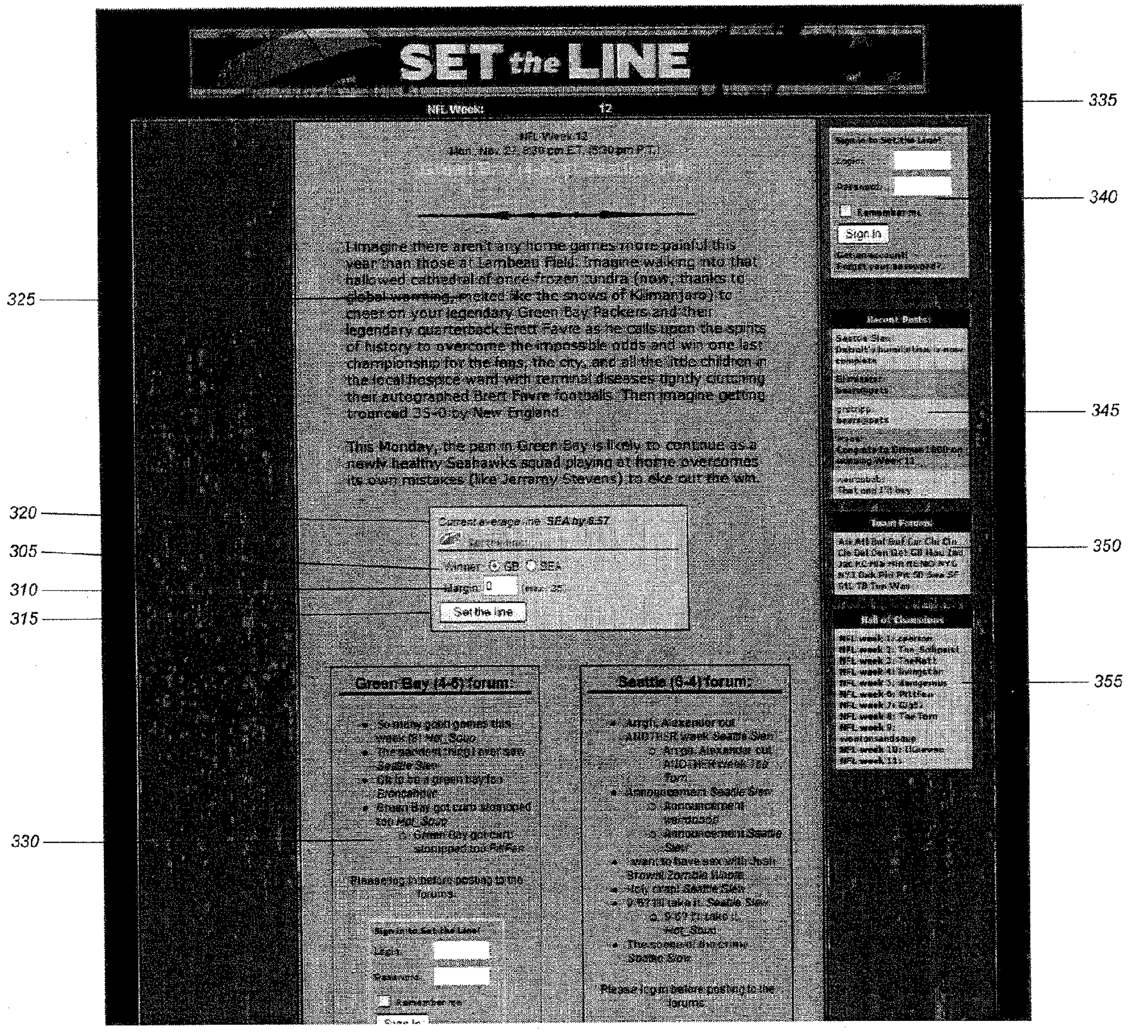
FIG. 3 illustrates an exemplary individual matchup page in another embodiment of the present invention.

FIG. 3 illustrates an exemplary matchup page interface 300 according to one embodiment of the present invention. The matchup page is focused on a single, specific event and may provide users with an interface to set the winner 305 and margin 310 for the event and then submit the chosen winner and margin using a submit link or button 315. By aggregating the input of all users who have chosen to enter a winner and margin for a specific event, an "average margin" or "average line" for the competitive event 320 may be calculated and displayed. In accordance with one embodiment, this calculation may be taken as an average of all margins entered for a specific event, with margins set for opposing teams considered offsetting. For example: if two users enter identical margin values for a matchup, but pick opposing teams, i.e. User A sets the margin as "Team A wins by 3 points" and User B sets the margin for the same event as "Team B wins by 3 points," the average margin calculated and displayed would be "0" or "Tie." If User A sets the margin as "Team A wins by 3 points" and User B sets the margin for the same event as "Team B wins by 1 point," the average margin calculated and displayed would be "Team A by 1 point." If User A sets the margin as "Team A wins by 3 points" and User B sets the margin for the same event as "Team A wins by 6 points," the average margin calculated and displayed would be "Team A by 4.5 points."

The matchup page also provides users with detailed game commentary 325 and a view into relevant discussion forums 330 that may be organized by event, team, week or season. Additional elements on the rankings page may include a means to navigate between different sets of events 335, a means for registered users to login and unregistered users to begin the registration process 340, the most recent, for example, five posts from the Web site's forums 345, links to specific forums 350, and a list of users who were winners from previous weeks or seasons 355.

FIG. 4 illustrates an exemplary scoring page interface 400 according to one embodiment of the present invention. Scoring pages may show an individuals user's score in a game for the current week of the game, listing for each event tracked, the predicted winner and margin 405, the actual winner and margin 410 and the calculated score based on the difference between the predicted margin and the actual margin 415. In accordance with one embodiment, the score is calculated by calculating the difference between the predicted margin set by the user and the margin of the actual event once it has transpired, treating margins that predict opposing winning teams as opposing values. For example: if User A sets the margin for an event as "Team A wins by 3 points" and Team A wins by 6 points, the user would be assigned a score of 3. If User A sets the margin as "Team A wins by 3 points" and Team B wins by 3 points, the user would be assigned a score of 6. If User A sets the margin as "Team A wins by 3 points" and Team A wins by 3 points, the user would be assigned a score of 0. To determine the user's total score for a set of events across a week or a season of events, the user's scores may be added together. In embodiments where users compete with each other, a lower score would be considered the winning score. A user must be registered to have his or her scores calculated, stored and displayed. The scoring page may also display the user's total score for the week 420 and average score per game for that week 425. Also displayed is the user's rank in the current grouping or "season" of competitive events 430 and an average score per game for those events 435. This page also includes a link to a page featuring profile information 440 about the user, for example, "Hans," and a means to navigate to scores for other weeks in the current grouping or season 445.

Additional features on the individual scoring page may include a means to navigate between different sets of competitive events 450, the most recent, for example, five posts from the Web site's forums 460, links to specific forums 465, and a list of users who were winners from previous weeks or seasons 470.

Figure 5:
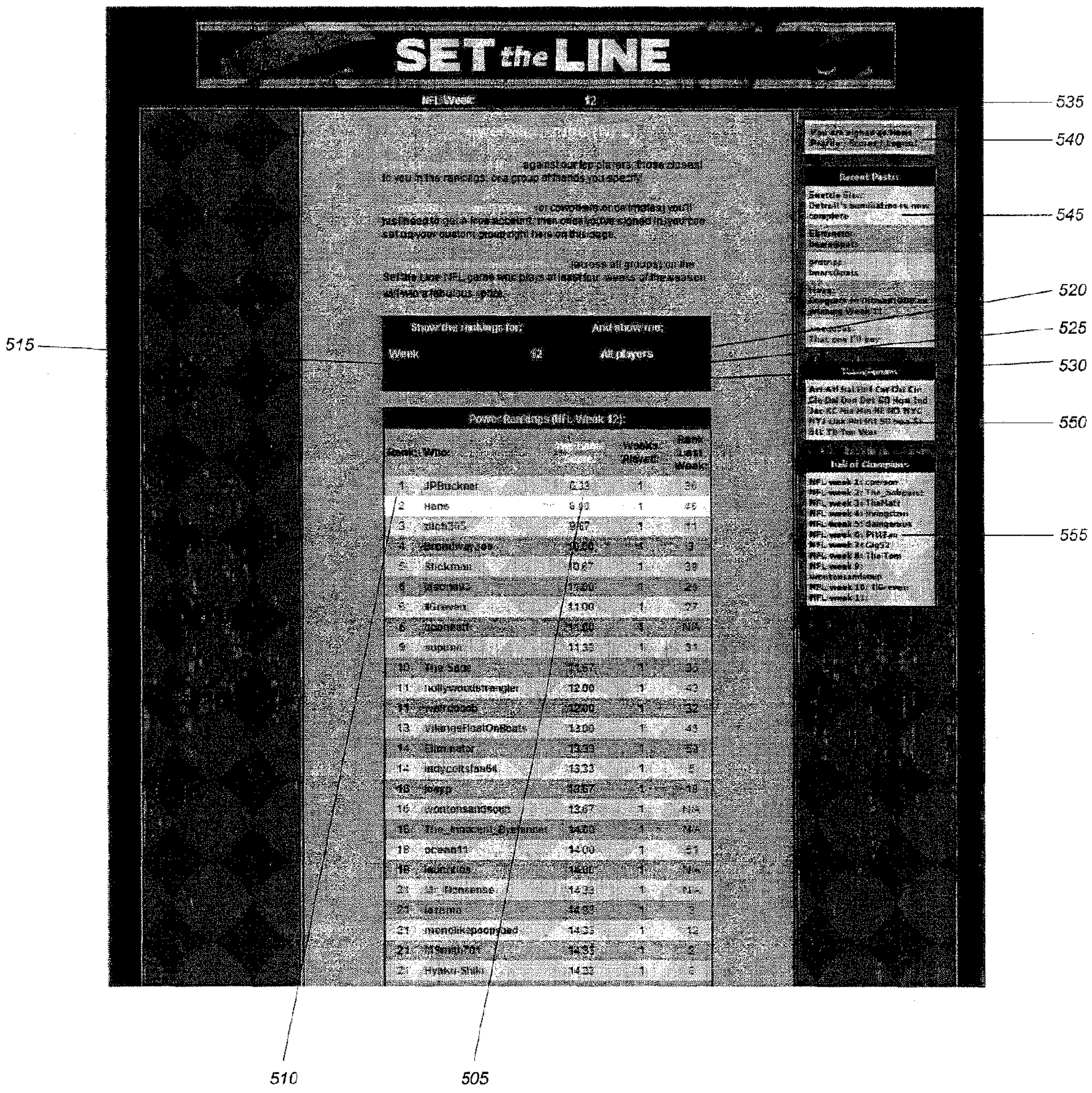
FIG. 5 illustrates an exemplary ranking page in another embodiment of the present invention.

FIG. 5 illustrates an exemplary rankings page interface 500 according to one embodiment of the present invention. The rankings page may provide users with a view including all registered users' scores calculated 505 and ranked 510. These rankings may be filtered by such criteria as specific week in the season or rankings for the overall grouping or "season" 515 of events being featured and scored against. These rankings may also be filtered to show the rankings of all users 520, only those users 525 whose rankings are calculated to be closest to those of the registered user viewing the list, or only a specific set of users 530 that the registered user viewing the list enters. Only users who have registered can have their scores calculated, ranked, and stored in this manner. Additional features on the rankings page may include a means navigate between different sets of competitive events 535, the most recent, for example, five posts from the Web site's forums 545, links to specific forums 550, and a list of users who were winners from previous weeks or seasons 555.

Figure 6:
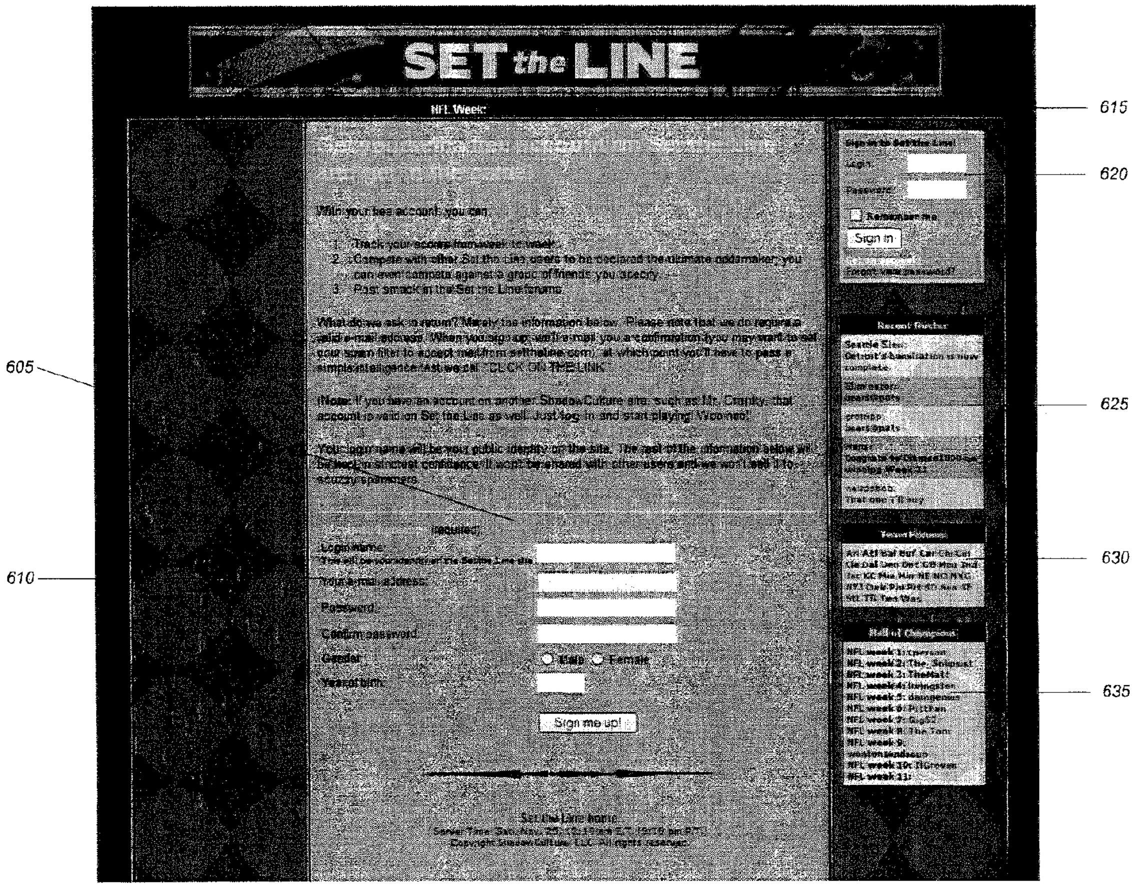
FIG. 6 illustrates an exemplary registration page in another embodiment of the present invention.

FIG. 6 illustrates an exemplary registration page interface 600 according to one embodiment of the present invention. The registration system utilizes and extends current registration and profile online systems. To register, users may enter basic information 605 and then e-mail validation 610 may be used to verify their accounts. By registering, the system is able to recognize the user, and store, track and display the user's score and ranking in such contexts as the scoring page and ranking page discussed in FIGS. 4 and 5. Additionally, registered users may enter profile information (city of residence, favorite teams, etc.) that other users may view. For unregistered users, a cookie may be set, for example, so that their entered values for individual competitive events can be persisted, but unregistered users will not have their scores calculated. Additional features on the registration page may include a means to navigate between different sets of competitive events 615, a means for registered users to login and unregistered users to begin the registration process 620, the most recent, for example, five posts from the Web site's forums 625, links to specific forums 630, and a list of users who were winners from previous weeks or seasons 635.

Figure 7:
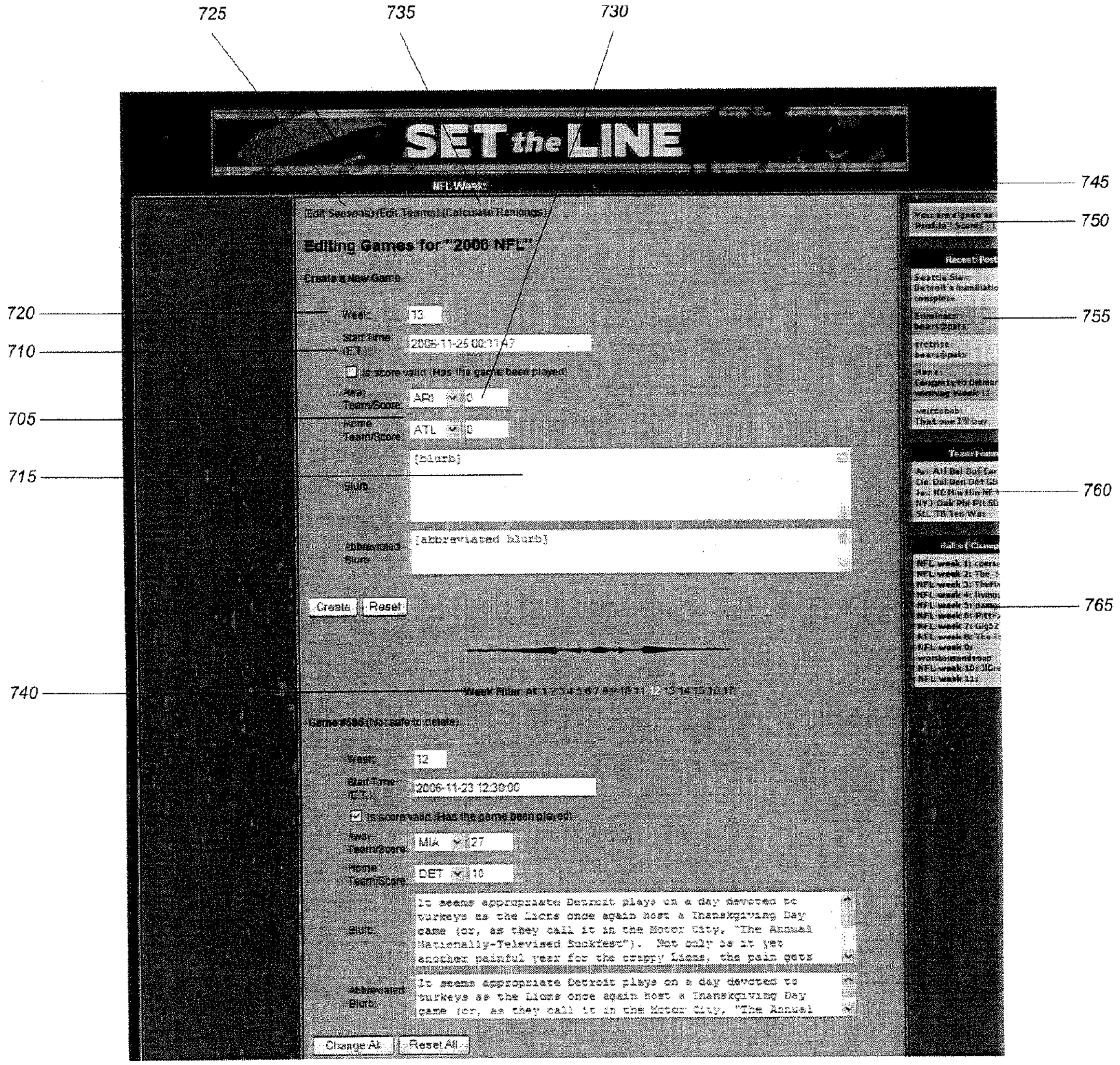
FIG. 7 illustrates an exemplary administrative page in another embodiment of the present invention.

FIG. 7 illustrates an exemplary administration page interface 700 according to one embodiment of the present invention. The administrative interface allows the game's publishers to establish the parameters of the events being used as the basis for the game: the teams 705, the time of the event 710, the commentary 715, and the organizational structure of multiple events (such as how they might be grouped into weeks 720, and weeks grouped into seasons 725). The administrative interface may also allow the game administrators to enter the results of the actual events 730 and calculate the scores and rankings of players playing the game 735. The administrative interface may also allow the game administrators to navigate to any set of games 740 in a particular grouping or "season". Events may be organized into groups or "seasons" and events within those groups may be further subcategorized into subgroups or "weeks." Multiple seasons (such as an NFL season, an NBA season and an "election winners" season) may appear on the site concurrently.

Additional features on the administration page may include a means to navigate between different sets of competitive events 745, the most recent, for example, five posts from the Web site's forums 755, links to specific forums 760, and a list of users who were winners from previous weeks or seasons 765.

The embodiments of the invention in which an exclusive property or privilege is claimed are defined as follows:

1. A computer-executed method for aggregating predictions from a plurality of users and for a plurality of upcoming sporting events, the computer-executed method comprising:

displaying identifiers for a plurality of sporting events that are upcoming;

registering a number of registered users from a plurality of users;

receiving from any of the plurality of users a predicted margin of victory for each sporting event;

for each sporting event, aggregating the received predicted margins of victory to generate an average predicted margin of victory for the sporting event and displaying the average predicted margin of victory on a web page;

after each of the plurality of sporting events occurs, recording an actual margin of victory for the sporting event;

for each registered user, for each sporting event for which the registered user provided a predicted margin of victory, calculating a score using the actual margin of victory and the predicted margin of victory received from the registered user and displaying the calculated score on an individual scoring web page; and for at least some of the registered users, displaying a user score and an identifier for the registered user on a rankings web page.

2. The computer-executed method of claim 1, further comprising:

for each sporting event, generating a match up web page displaying information pertaining to the sporting event.

3. The computer-executed method of claim 1, wherein aggregating the received predicted margins of victory comprises calculating an average of the received predicted margins of victory.

4. The computer-executed method of claim 1, further comprising for each registered user, displaying on the individual scoring web page a list of the sporting events, the registered user's predicted margin of victory and the actual margin of victory for each of the sporting events, and the difference between the user's predicted margin of victory and the actual margin of victory.

5. A computer-readable medium having instructions stored thereon that direct a computing system to aggregate predictions from a plurality of users and for a plurality of sporting events, the instructions:

display identifiers for a plurality of sporting events that are upcoming;

register a number of registered users from a plurality of users;

receive from any of the plurality of users a predicted margin of victory for each sporting event;

for each sporting event, aggregate the received predicted margins of victory to generate an average predicted margin of victory for the sporting event and display the average predicted margin of victory on a first electronic document;

after each of the plurality of sporting events occurs, record an actual margin of victory for the sporting event;

for each registered user, for each sporting event for which the registered user provided a predicted margin of victory, calculate a score using the actual margin of victory and the predicted margin of victory received from the registered user and display the calculated score on a second electronic document; and for at least some of the registered users, display a user score and an identifier for the registered user on a third electronic document.

6. A computing system for aggregating predictions from a plurality of users and for a plurality of upcoming sporting events, the computing system comprising:

a component adapted to display identifiers for a plurality of sporting events that are upcoming, and to register a number of registered users from a plurality of user;

a component adapted to receive and store from any of the plurality of users a predicted margin of victory for each sporting event;

a component adapted to, for each sporting event, aggregate the received predicted margins of victory to generate an average predicted margin of victory for the sporting event and to display the average predicted margin of victory on a first Internet document;

a component adapted to record an actual margin of victory for each of the plurality of sporting events;

for each registered user, for each sporting event for which the registered user provided a predicted margin of victory, a component adapted to calculate a score using the actual margin of victory and the predicted margin of victory received from the registered user, and to display the calculated score on a second Internet document; and for at least some of the registered users, a component adapted to display a user score and an identifier for the registered user on a third Internet document.

* * * * *